(12) United States Patent
LV

(10) Patent No.: US 8,226,135 B1
(45) Date of Patent: Jul. 24, 2012

(54) LOCKING ARRANGEMENT AND CULINARY UTENSIL COMPRISING SAME

(75) Inventor: Bing Yuan LV, Guangdong (CN)

(73) Assignee: Maxpat Trading and Marketing (Far East) Limited, Kowloon (HK)

(*) Notice: Subject to any disclaimer, the term of this patent is extended or adjusted under 35 U.S.C. 154(b) by 0 days.

(21) Appl. No.: 13/222,417

(22) Filed: Aug. 31, 2011

(51) Int. Cl.
*A47G 21/10* (2006.01)
*A47J 43/28* (2006.01)

(52) U.S. Cl. .......................................... 294/16; 294/99.2

(58) Field of Classification Search ............ 294/16, 294/99.2, 5, 7, 8, 8.5, 33, 100, 106, 110.1; D7/686
See application file for complete search history.

(56) References Cited

U.S. PATENT DOCUMENTS

| | | | | |
|---|---|---|---|---|
| 6,056,338 | A * | 5/2000 | Kerr | 294/16 |
| 6,092,847 | A * | 7/2000 | Kwan | 294/16 |
| 7,086,676 | B2 * | 8/2006 | Sumter et al. | 294/16 |
| 7,316,434 | B1 * | 1/2008 | Kerr | 294/16 |
| 7,637,547 | B2 * | 12/2009 | Schneider | 294/16 |

* cited by examiner

*Primary Examiner* — Paul T Chin
(74) *Attorney, Agent, or Firm* — Heslin Rothenberg Farley & Mesiti PC

(57) ABSTRACT

The present invention is concerned with a locking arrangement having a first wall defining a surface and a second wall defining a surface with the surfaces abutting each other. The first wall is provided with a first bulge defining a first elongate groove facing a first direction and the second wall is provided with a second bulge defining a second elongate groove facing a second direction opposite to the first direction, and the grooves are positioned to define a channel in which a ball bearing is movable there across. The first groove has a substantially same width there across and the second groove has a narrower end and a wider end, the locking arrangement is adapted to, depending on the orientation of the channel, assume a first configuration in which the ball bearing is positioned at one end of the channel or a second configuration in which the ball bearing is positioned at the opposite end of the channel. In one of the two configurations when the channel is oriented to allow the ball bearing to roll to the wider end of the groove, the ball bearing becomes out of a path of relative movement of the walls whereby the walls become movable relative each other and hence unlocking the locking arrangement for the walls.

20 Claims, 3 Drawing Sheets

LOCKING ARRANGEMENT AND CULINARY UTENSIL COMPRISING SAME

FIELD OF THE INVENTION

The present invention is concerned with a locking arrangement and a utensil comprising such arrangement; the invention is in particular concerned with but not limited to a culinary utensil comprising such arrangement. The culinary utensil may be a culinary tong or clamp.

BACKGROUND OF THE INVENTION

There are a variety of conventional tong or clamp like-utensils for picking up an object. In the context of culinary utensils, for example a culinary tong, the tong may be used for picking up a food object. Such utensils typically have a pair of arms connected together at a pivot joint. A spring means is provided to bias the arms to a far apart configuration. In use, when a food object is to be picked up the arms are firstly allowed to be spread out. Then when the food object is located between the front ends of the arms and the arms are squeezed together the food object can be held tight by the arms. In order to maintain the position, the arms have to be held firmly together by the fingers of a user. This can be difficult in particular if the spring means for biasing the arms apart are particularly strong because the fingers would have to act against the biasing force of the spring means. The holding of the arms together can also be difficult if the food object being held is heavy or the food object is to be held for a prolong period of time.

Another problem with conventional tong or clamp like-utensils is that when they are not in use, the arms are biased to spread apart. As such, the utensils become larger and difficult to stow. One solution has been to provide a ring for holding the arms together. However, the ring can be difficult to maneuver and they are not aesthetically pleasant either.

It may be possible to introduce an actuation lock so that on pressing, sliding or pulling of a switch thereof the arms are locked to stay close together. However, the working of the actuation lock can be adversely interfered when the utensil is used to pick with food objects with grease or sauce. The grease or sauce can hinder working of moving parts or the switch. Further, maneuvering food with such utensil and controlling locking of the arms simultaneously can be difficult.

The present invention seeks to address the above problems or at least to provide an alternative to the public.

SUMMARY OF THE INVENTION

According to a first aspect of the present invention, there is provided a tong or clamp apparatus for picking up an object, comprising (a) a first member having an elongate arm at a front end thereof and a first wall at a rear end thereof, and a second member having an elongate arm at a front end and a second wall at a rear end thereof and pivotably connected with and movable relative to the first member, wherein (i) the first wall includes a first bulge defining a first groove at an inwardly facing side thereof, and the second wall includes a second bulge defining a second groove at an outwardly facing side thereof, (ii) one of the first and the second grooves is generally elongate in shape with substantially same width there across, and the other groove is generally elongate in shape but having a substantially widened end, (iii) the grooves are positioned such that the first and the second grooves together define a channel for accommodating a ball bearing, (iv) the ball bearing is movable along the channel in response to the orientation of the apparatus, (v) the apparatus is adapted to assume a first configuration in which the ball bearing is positioned at one end of the channel or a second configuration in which the ball bearing is positioned at the opposite end of the channel, in that in one of the two configurations the walls and hence the arms are prevented from moving relative each other by the ball bearing and in the other configuration the walls and hence the arms are movable relative to each other, and (vi) in the configuration when the walls are movable relative to each other the ball bearing is located at the widened end of the groove or in the configuration when the walls are immovable relative to each other the ball bearing is located at the end of the groove opposite to the widened end. With such an arrangement, the locking or unlocking of the walls can be achieved by manipulating the orientation of the apparatus such that the ball bearing is moved to a desired location in the channel; no addition of an actuation switch or pressing of such actuation switch by the thumb or fingers of the user is required. On other words, the locking or unlocking of the walls or the arms can be achieved in a one-hand operation.

Preferably, the apparatus may comprise a pair of the first walls and a pair of the second walls, and the pair of first walls may be sandwiched by the pair of the first walls.

In an embodiment, the bulge may define a protrusion at an outwardly facing side thereof, and the second bulge may define a protrusion at an inwardly facing side thereof.

Each of the first member, the second member, the first groove and the second groove generally defines a longitudinal axis along its length.

In one embodiment, the longitudinal axis of the first member and the longitudinal axis of the first groove are generally arranged in parallel with each other and in the second configuration the longitudinal axis of the first member and the longitudinal axis of the second groove are generally arranged in parallel with each other.

In a preferred embodiment, the widened end of the groove may be arranged at a forward position.

In another preferred embodiment, the apparatus may comprise means for biasing the first member and the second member away from each other. The apparatus may comprise a pin extending across the first wall, the second wall and the biasing means.

According to a second aspect of the present invention, there is provided a locking structure comprising, (a) a first member including a first wall at one end thereof, (b) a second member including a second wall at one end thereof, the first wall and the second wall are movable relative to each other, wherein (i) the first wall includes a first bulge defining a first groove at an inwardly facing side thereof, and the second wall includes a second bulge defining a second groove at an outwardly facing side thereof, (ii) one of the grooves is generally elongate in shape with substantially same width there across, and the other groove is generally elongate in shape but having a substantially widened end, (iii) the grooves are positioned such that the first and second grooves together define a channel for accommodating a ball bearing, (iv) the ball bearing is movable along the channel, (v) the locking structure is adapted to assume a first configuration in which the ball bearing is positioned at one end of the channel or a second configuration in which the ball bearing is positioned at the opposite end of the channel, in that in one of the two configurations the walls are immovable relative each other due to the ball bearing and in the other configuration the walls are movable relative to each other, and (vi) in the configuration when the walls are movable relative to each other the ball bearing is located at the widened end of the groove or in the configuration when the walls are immovable relative to each other the ball bearing is located at the end of the groove opposite to the widened end.

Preferably, the first member includes a pair of the first walls and the second member includes a pair of the second walls. The two second walls may be sandwiched by the two first walls.

In an embodiment, each of the first member, the second member, the first groove and the second groove generally defines a longitudinal axis along its length. The longitudinal axis of the first member and the longitudinal axis of the first groove or in the second configuration the longitudinal axis of the first member and the longitudinal axis of the second groove may generally be arranged in parallel with each other.

In a preferred embodiment, the widened end of the groove may be arranged at a forward position.

In one embodiment, the locking structure may comprise means for biasing the first member and the second member away from each other. The biasing means may generally be in the shape of the letter "V" having two legs connected by a helical spring member.

In a preferred embodiment, the locking structure may comprise a pin extending across the walls of the first member and the second member.

The locking structure may comprise means for biasing the first member and the second member away from each other and a pin extending across the walls of the first member, the second member and the biasing means.

According to a third aspect of the present invention, there is provided a locking arrangement comprising a first wall defining a first surface and a second wall defining a second surface with the surfaces abutting each other, the first wall is provided with a first bulge defining a first elongate groove facing a first direction and the second wall is provided with a second bulge defining a second elongate groove facing a second direction opposite to the first direction, the grooves are positioned to define a channel in which a ball bearing is movable there across, the first groove has a substantially same width there across and the second groove has a narrower end and a wider end, the locking arrangement is adapted to, depending on the orientation of the channel, assume a first configuration in which the ball bearing is positioned at one end of the channel or a second configuration in which the ball bearing is positioned at the opposite end of the channel, wherein in one of the two configurations when the channel is oriented to allow said ball bearing to roll to the wider end of the groove said ball bearing becomes out of a path of relative movement of said walls whereby said walls become movable relative each other and hence unlocking the locking arrangement for said walls, and in the other configuration when the channel is oriented to allow said ball bearing to roll to the narrower end of the groove said ball bearing is located in the path of relative movement of said walls whereby said walls become immovable relative each other and hence locking the locking arrangement for said walls.

In an embodiment, the first bulge may also define a protrusion at an outwardly facing side thereof, and said second bulge defines a protrusion at an inwardly facing side thereof.

BRIEF DESCRIPTION OF DRAWINGS

Some embodiments of the present invention will now be explained, with reference to the accompanied drawings, in which:—

FIG. 4b is a schematic cross section view showing a portion of FIG. 4a; and

DETAILED DESCRIPTION OF PREFERRED EMBODIMENTS OF THE INVENTION

The present invention is concerned with a locking arrangement, a locking mechanism or a locking structure, and a utensil comprising such an arrangement, mechanism or structure. The use of arrangement, mechanism and structure hereinafter is interchangeable.

Figure 1:
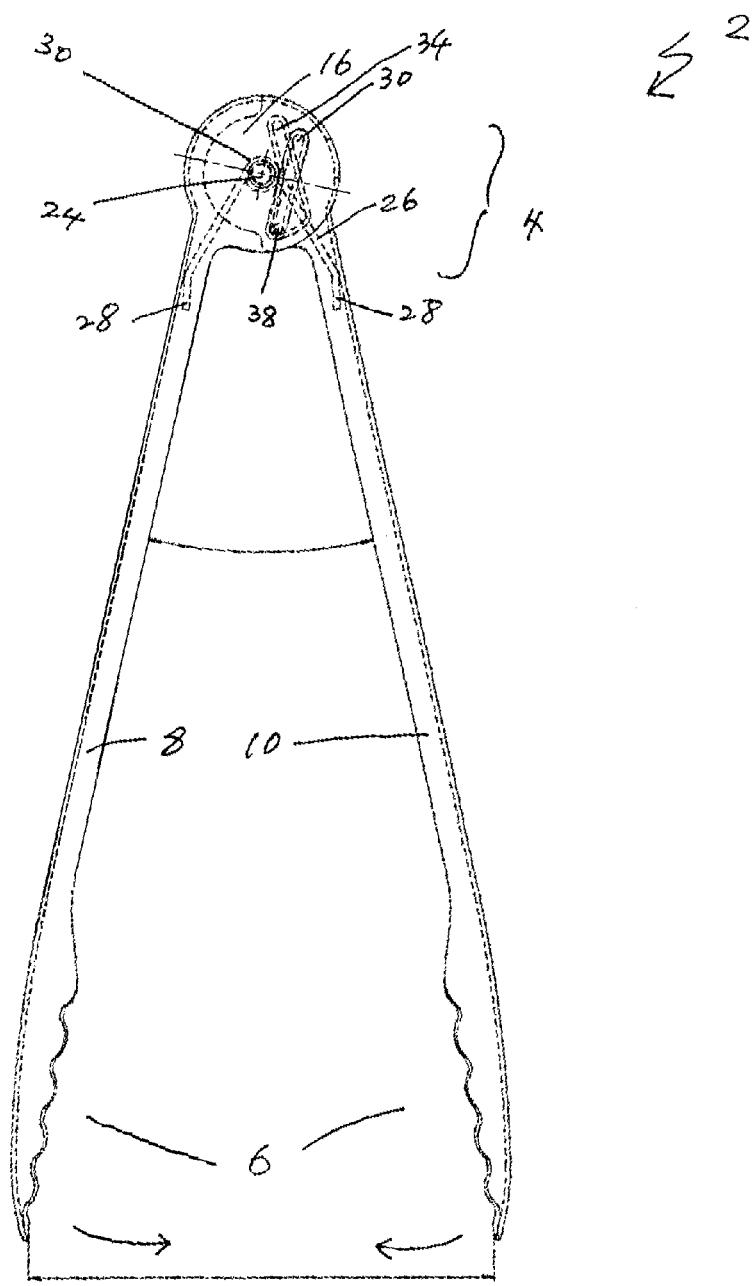
FIG. 1 is a schematic (side) view showing an embodiment of a culinary tong disposed in a certain configuration according to the present invention.

FIG. 1 is a schematic view of a pair of culinary tongs or a tong, generally designated 2, according to an embodiment of the present invention. This schematic view depicts an image of the tong 2 when viewed from a side thereof although the interior construction of a joint and a locking arrangement of the tong 2 located at its rear portion 4 is also depicted schematically.

Figure 5:
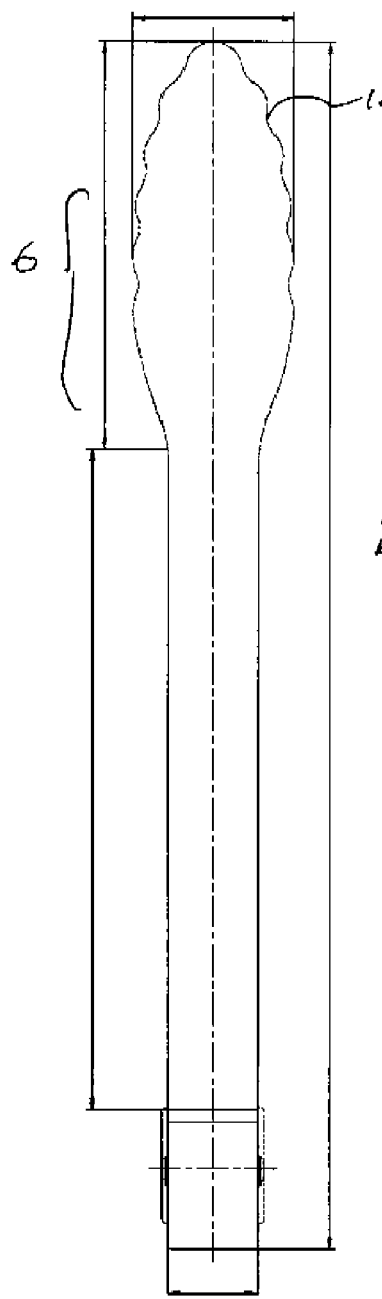
FIG. 5 is a schematic (bottom) view showing the culinary tong of FIG. 2.

The tong 2 comprises a front portion or a utility portion 6 having a first arm 8 and a second arm 10. The first arm 8 and the second arm 10 are made of stainless steel plates which have been stamped to conform to a particular shape and curvature. Specifically, in this embodiment, the arms 8, 10 have a predetermined wider front end 12 (also shown in FIGS. 2 and 5) which facilitates picking up of a food object. The corrugated edging 14 at the front end 12 of the arms 8, 10 also facilitates the picking up of a food object.

Figure 3:
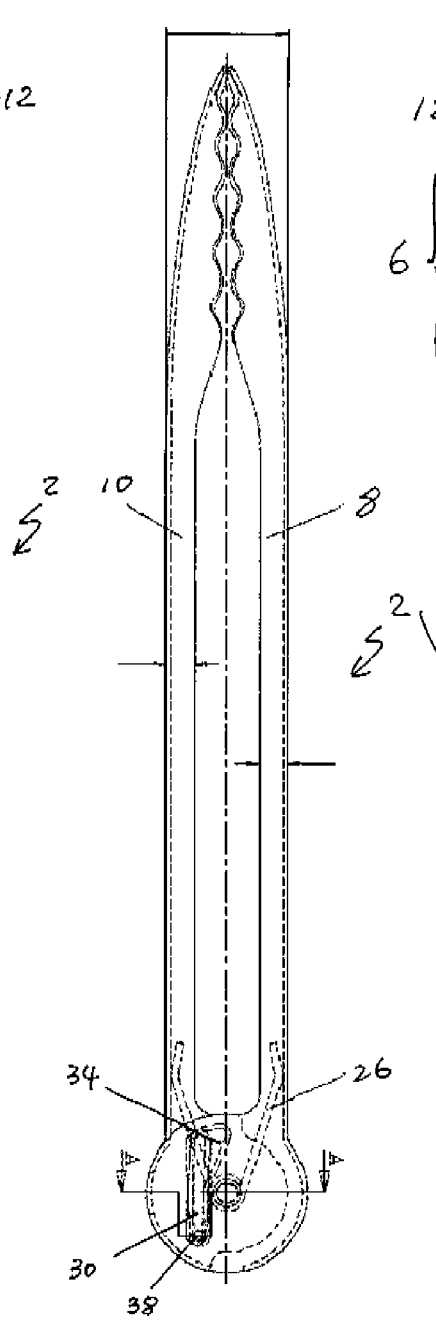
FIG. 3 is a schematic (side) view showing the culinary tong of FIG. 1 but in another configuration.

The rear portion 4 of the tong 2 also serves as a handle portion onto which a user grasps in use. The handle portion 4 contains a construction in which a locking mechanism resides. The rear portion 4 of the first arm 8 has a pair of walls or plates 16, 18 (see also FIG. 4) arranged on opposite lateral sides thereof. In this embodiment, the walls 16, 18 are generally circular in profile, as shown in FIGS. 1 and 3. The rear portion 4 of the second arm 10 similarly has a pair of walls or plate 20, 22 (see FIG. 4a) arranged on opposite lateral sides thereof. The rear portion 4 of the tong 2 is configured such that the walls 20, 22 of the second arm 10 are sandwiched by the walls 16, 18 of the first arm 8.

The first arm 8 and the second arm 10 are pivotably connected together by a pivot pin 24 extending from one lateral side thereof to the opposite side and defining a pivot axis, as shown in FIGS. 1 to 5. With the pivot pin 24, it is to be understood that the first arm 8 and the second arm 10 are pivotably movable relative to each other at the pivot pin 24 within a predetermined range, as shown by the arrows in FIG. 1. The first arm 8 and the second arm 10 thus cannot spread apart beyond the predetermined range when rear edges of the first arm 8 and the second arm 10 abut each other.

The tong 2 is provided with means for biasing the first arm 8 and the second arm 10 away from each other. In this embodiment, the biasing means takes the form of a wire spring 26 with a shape generally resembling the English letter "V". Please see FIGS. 1, 2 and 3. The wire spring 26 has two legs 28 and a spring coil 30. The two legs 28 abut an inner surface of the rear end of the first arm 8 and an inner surface of the rear end of the second arm 10, respectively. Due to the inherent biasing nature of the wire spring 26, the arms 8, 10, in the absence of other interference, are biased away from each other, as shown in FIG. 1. As can be seen from the figures and in particular FIG. 4a, the pivot pin 24 extends through the walls 16, 20, the spring wire 30 of the spring 26 and the walls 22, 18 and the wire spring 26.

Figure 4A:
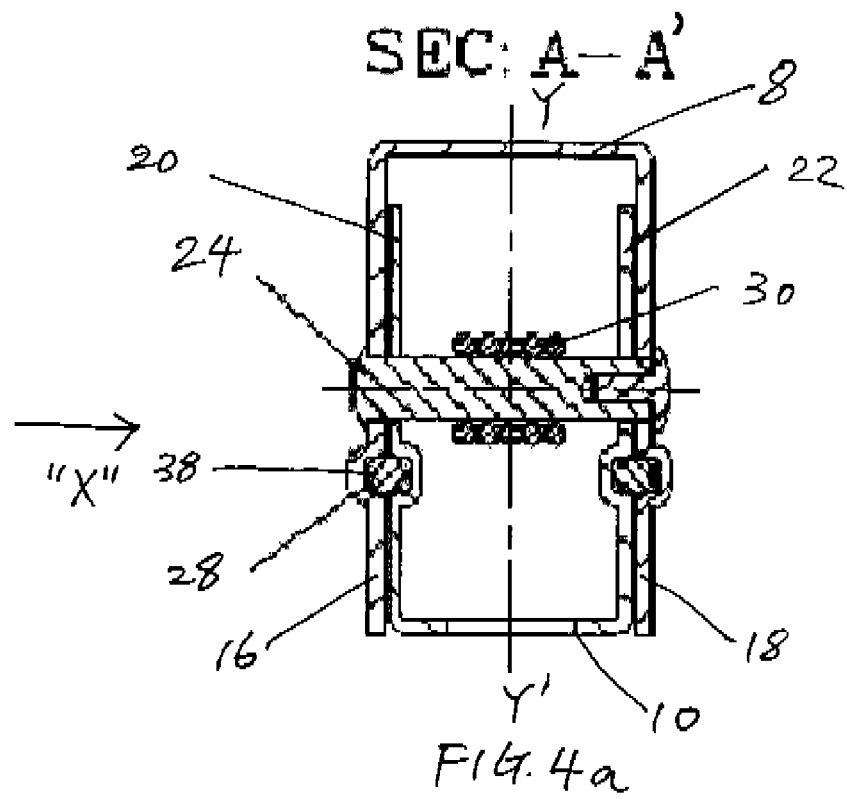
FIG. 4a is a schematic cross section view of a rear end of the culinary tong taken at A-A' of FIG. 3.
Figure 4B:
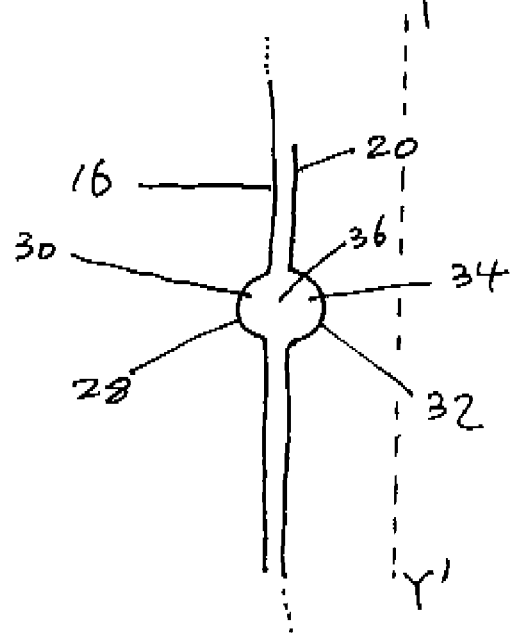

Referring to FIGS. 4a and 4b, the tong 2 is provided with the locking arrangement which serves to control the locking status thereof. The locking arrangement makes use of the walls 16, 18 of the first arm 8 and the walls 20, 22 of the second arm 10. Each wall 16, 18 of the first arm 8 is configured such that there is provided a bulge 28. In this embodiment, when the tong 2 is viewed from the side designated by "X" in FIG. 4a, the bulge 28 resembles a protrusion. However, it is to be understood from FIGS. 4a-b that the opposite side of the bulge 28 takes the form of a groove 30. The groove 30 is elongate in shape and has a substantially equal width, and extends from a rear part of the wall 16 to a front part of the wall 16. The elongate groove 30 generally defines a longitudinal axis which is generally in parallel to the longitudinal axis of the first arm 8.

The walls 20, 22 of the second arm 10 is configured such that there is also provided with a similar bulge 32 defining a protrusion on one side (outwardly facing side) and a groove on the opposite side (inwardly facing side). The difference between the bulge 28 of the wall 16 of the first arm 8 and the adjacent bulge 32 of the wall 20 of the second arm 10 is that the protrusion of the bulge 28 of the first arm 8 points away from the tong 2 (or a central axis Y-Y') while the protrusion of the bulge 32 of the second arm 10 points into the tong 2 (or towards the central axis Y-Y'. In other words, the surface of the wall 16 of the first arm 8 defining the groove 30 is inwardly facing (towards the central axis Y-Y') while the surface of the wall 20 of the second arm 10 defining a groove 34 is outwardly facing (away from the central axis Y-Y'. It is to be noted that the meaning of "outwardly" and "inwardly" used herein merely serves to designate the relative orientation and does not limit the meaning to a particular orientation.

As shown in FIG. 4b, the grooves 30, 34 of the walls 16, 20 together define a channel 36 for accommodating a ball bearing 38.

Figure 2:
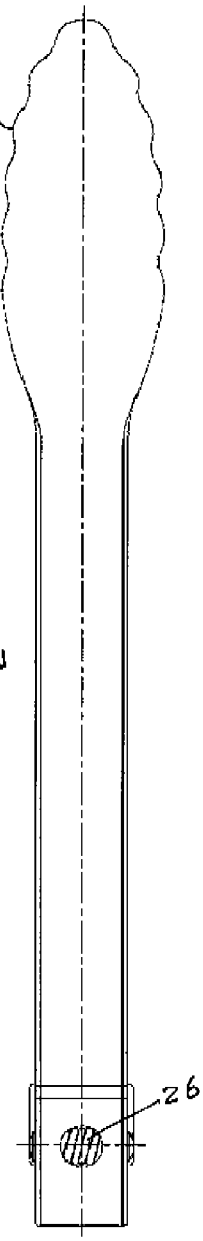
FIG. 2 is a top view of the culinary tong in FIG. 1.

Referring to FIGS. 1 and 3, it is however to be noted that the grooves 30, 34 are different in a further aspect. While the groove 30 of the first wall 16 is elongate in shape with a generally equal width with there across, the groove 34 of the second wall 20 is also elongate in shape but with a narrower rear end 38 and a wider front end 40. The wider front end of the groove 34, as shown in FIGS. 1 and 2, resembles a fan shaped configuration. Despite the different configurations of the grooves 30, 34, the grooves 30, 34 are however positioned adjacent each other and together they define the channel 36 for accommodating the ball bearing 38 which is movable therein. The ball bearing is sized to fit in, slidable therein, and would not fall out of the channel 36. As shown in FIG. 4a, in this embodiment the left rear portion of the tong 2 is generally symmetrical to that of the right rear portion of the tong 2. The working of the locking arrangement is now explained as follows.

FIG. 1 illustrates a first configuration of the tong 2 in which the arms 8, 10 are not locked against movement relative each other. In this configuration, the tong 2 is oriented with the front portion 6 or the arms 8, 10 pointing towards the ground and the rear portion 4 pointing upwardly. In other words, the front portion 6 is situated below the pivot pin 24 or the channel 36. By situating below, it means the front portion is situated at a level which is below the level of the pivot pin 24 or the channel 36. It can be seen that due to gravity the ball bearing 38 is positioned at the lowest end of the channel 36 or a forward end of the channel 36 and the arms 8, 10 are biased apart by the wire spring 26. As long as the ball bearing 38 stays in this lowest or forward position in the channel 36, the arms 8, 10 can be brought together freely by squeezing thereof. When the squeezing action is removed the arms 8, 10 return to a biased spread apart configuration. This is because in this configuration the ball bearing 38 is situated in a position which is out of the path of relative movement of the walls. It means that when the tong 2 is oriented with the front portion 6 situated below the channel 36 and a food object is situated between the front end of the arms 8, 10, the arms 8, 10 can be brought together with a squeeze, or when action of the squeeze is remove the food object can be released. In other words, in this orientation, food can be picked up or released freely because the locking arrangement is not activated.

FIG. 3 illustrates a second configuration of the tong 2 in which the arms 8, 10 are brought close to and adjacent each other and they are locked against movement relative each other. In this configuration, the tong 2 is oriented with the front portion 6 or the arms 8, 10 pointing away from the ground and the rear portion 4 pointing downwardly. In other words, the front end 6 of the arms 8, 10 is situated above the channel 36. It can be seen that the ball bearing 38 is positioned at the other end (or the opposite end) or the rear end of the channel 36 and the arms 8, 10 stay close together despite the biasing action of the spring 26. This is because the ball bearing 38 is situated in a location in the channel 36 where it blocks the relative movement of the walls 16, 20. As long as the ball bearing 38 stays in this rear or back position (due to gravity) in the channel 36, the arms 8, 10 cannot be spread apart. This is because the ball bearing 38 is located in the path of relative movement of the walls 8, 10. This configuration is suitable when a food object is being held between the arms 8, 10 or when the tong 2 has been stowed away. In this orientation, food can be held between the arms 8, 10 because the locking arrangement has been activated. It is to be understood that the tong 2 does not have to point upwardly and vertically to effect the locking status. As long as the front portion of the tong 2 is situated above the channel, the same locking status can be achieved. The locking can be released by orienting the tong 2 such that the front end 6 of the tong 2 points downwardly or when the front end 6 is situated below the channel 36. With this orientation, the front end 6 of the tong 2 is situated below the channel 36, a slight squeeze of the arms 8, 10 can unlock the locking mechanism. This is because when the orientation is changed accordingly and the arms 8, 10 are slightly squeezed together, the ball bearing 38 is released and becomes moveable within the channel 36. By gravity the ball bearing 38 rolls from the rear end of the channel 36 to the front end of the channel 36.

In this embodiment, the arms 8, 10 are adapted to be locked in a position half way between a fully spread apart position and a fully closed position. This is achieved by squeezing or bringing and holding the arms 8, 10 to a desired relative position and then orienting the tong 2 such that the arms 8, 10 point upwardly to the extent that the front portion 6 is situated above the channel 36. Once this is done the desired relative position of the arms 8, 10 can be maintained with, for example, the food object held between the arms 8, 10 until the locking arrangement is unlocked.

In this embodiment, each of the first arm 8, the second arm 10, the first groove 30 and the second groove 34 generally defines a longitudinal axis. In the second configuration, the longitudinal axis of the first arm 8 and the longitudinal axis of the first groove 38 or in the second configuration the longitudinal axis of the first arm 6 and the longitudinal axis of the second groove are generally in parallel with each other. In alternative embodiments, this is not necessarily so in that the grooves or the channel may be positioned differently in relation to the arms. In such other embodiments, the locking or unlocking of the locking arrangement is however still determined by the orientation of the channel or the position of the ball bearing. When the ball bearing is positioned in a location or an end of the channel due to gravity where movement of the walls are blocked by the ball bearing the locking arrangement is in its locked position. On the other hand, when the ball bearing is positioned in a location or an (the other) end of the channel (e.g. having a groove with a widened width) the walls are not blocked the locking arrangement is in its unlocked position.

In the above embodiment, the locking arrangement has two pair of walls and two ball bearings in that one wall from each pair of walls and the respective ball bearing act as a locking mechanism. In other words, there are two parallel locking mechanisms on opposite sides of thereof. However, in an alternative embodiment a similar locking arrangement may be provided in which only one pair of adjacent walls and one ball bearing is provided. Such alternative embodiment would also work.

It is envisaged that the above described locking arrangement has only one moving part, i.e. the ball bearing. Manipulation of the moving part is effected by merely moving the utensil in a certain orientation. The ball bearing is enclosed in a channel not easily accessible by, for example, grease, sauce, etc., in that the channel effectively is essentially an enclosed chamber or otherwise insulated or closed from the surroundings. Thus, there is a minimal chance that the arrangement would malfunction.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. A tong or clamp apparatus for picking up an object, comprising:—
   (a) a first member having an elongate arm at a front end thereof and a first wall at a rear end thereof; and
   (b) a second member having an elongate arm at a front end and a second wall at a rear end thereof and pivotably connected with and movable relative to said first member;
   wherein:
   (i) said first wall includes a first bulge defining a first groove at an inwardly facing side thereof, and said second wall includes a second bulge defining a second groove at an outwardly facing side thereof;
   (ii) one of the first and the second grooves is generally elongate in shape with substantially same width there across, and the other groove is generally elongate in shape but having a substantially widened end;
   (iii) the grooves are positioned such that the first and the second grooves together define a channel for accommodating a ball bearing;
   (iv) the ball bearing is movable along the channel in response to the orientation of said apparatus;
   (v) said apparatus is adapted to assume a first configuration in which said ball bearing is positioned at one end of the channel or a second configuration in which said ball bearing is positioned at the opposite end of the channel, in that in one of the two configurations said walls and hence said arms are prevented from moving relative each other by said ball bearing and in the other configuration said walls and hence said arms are movable relative to each other; and
   (vi) in the configuration when said walls are movable relative to each other said ball bearing is located at the widened end of the groove or in the configuration when said walls are immovable relative to each other said ball bearing is located at the end of the groove opposite to the widened end.

2. An apparatus as claimed in claim 1, comprising a pair of said first walls and a pair of said second walls, and the pair of first walls is sandwiched by the pair of the first walls.

3. An apparatus as claimed in claim 1, wherein said first bulge defines a protrusion at an outwardly facing side thereof, and said second bulge defines a protrusion at an inwardly facing side thereof.

4. An apparatus as claimed in claim 1, wherein each of said first member, said second member, the first groove and the second groove generally defines a longitudinal axis along its length.

5. An apparatus as claimed in claim 1, wherein the longitudinal axis of said first member and the longitudinal axis of the first groove are generally arranged in parallel with each other and in the second configuration the longitudinal axis of said first member and the longitudinal axis of the second groove are generally arranged in parallel with each other.

6. An apparatus as claimed in claim 1, wherein the widened end of the groove is arranged at a forward position.

7. An apparatus as claimed in claim 1, comprising means for biasing said first member and said second member away from each other.

8. An apparatus as claimed in claim 7, comprising a pin extending across said first wall, said second wall and said biasing means.

9. A locking structure comprising:—
   (a) a first member including a first wall at one end thereof; and
   (b) a second member including a second wall at one end thereof, said first wall and said second wall are movable relative to each other;
   wherein:
   (i) said first wall includes a first bulge defining a first groove at an inwardly facing side thereof, and said second wall includes a second bulge defining a second groove at an outwardly facing side thereof;
   (ii) one of the grooves is generally elongate in shape with substantially same width there across, and the other groove is generally elongate in shape but having a substantially widened end;
   (iii) the grooves are positioned such that the first and second grooves together define a channel for accommodating a ball bearing;
   (iv) the ball bearing is movable along the channel;
   (v) the locking structure is adapted to assume a first configuration in which said ball bearing is positioned at one end of the channel or a second configuration in which said ball bearing is positioned at the opposite end of the channel, in that in one of the two configurations said walls are immovable relative each other due to said ball bearing and in the other configuration said walls are movable relative to each other; and
   (vi) in the configuration when said walls are movable relative to each other said ball bearing is located at the widened end of the groove or in the configuration when said walls are immovable relative to each other said ball bearing is located at the end of the groove opposite to the widened end.

10. A locking structure as claimed in claim 9, wherein said first member includes a pair of said first walls and said second member includes a pair of said second walls.

11. A locking structure as claimed in claim 9, wherein the two said second walls are sandwiched by the two said first walls.

12. A locking structure as claimed in claim 9, wherein each of said first member, said second member, the first groove and the second groove generally defines a longitudinal axis along its length.

13. A locking structure as claimed in claim 12, wherein the longitudinal axis of the first member and the longitudinal axis of the first groove or in the second configuration the longitudinal axis of the first member and the longitudinal axis of the second groove are generally arranged in parallel with each other.

14. A locking structure as claimed in claim 9, wherein the widened end of the groove is arranged at a forward position.

15. A locking structure as claimed in claim 9, comprising means for biasing said first member and said second member away from each other.

16. A locking structure as claimed in claim 15, wherein said biasing means is generally in the shape of the letter "V" having two legs connected by a helical spring member.

17. A locking structure as claimed in claim 9, comprising a pin extending across said walls of said first member and said second member.

18. A locking structure as claimed in claim 9, comprising means for biasing said first member and said second member away from each other and a pin extending across said walls of said first member, said second member and said biasing means.

19. A locking arrangement comprising a first wall defining a first surface and a second wall defining a second surface with the surfaces abutting each other, said first wall is provided with a first bulge defining a first elongate groove facing a first direction and said second wall is provided with a second bulge defining a second elongate groove facing a second direction opposite to the first direction, the grooves are positioned to define a channel in which a ball bearing is movable there across, the first groove has a substantially same width there across and the second groove has a narrower end and a wider end, said locking arrangement is adapted to, depending on the orientation of the channel, assume a first configuration in which said ball bearing is positioned at one end of the channel or a second configuration in which said ball bearing is positioned at the opposite end of the channel, wherein in one of the two configurations when the channel is oriented to allow said ball bearing to roll to the wider end of the groove said ball bearing becomes out of a path of relative movement of said walls whereby said walls become movable relative each other and hence unlocking the locking arrangement for said walls, and in the other configuration when the channel is oriented to allow said ball bearing to roll to the narrower end of the groove said ball bearing is located in the path of relative movement of said walls whereby said walls become immovable relative each other and hence locking the locking arrangement for said walls.

20. A locking arrangement as claimed in claim 19, wherein said first bulge defines a protrusion at an outwardly facing side thereof, and said second bulge defines a protrusion at an inwardly facing side thereof.

* * * * *